(12) United States Patent
Salas-Moreno et al.

(10) Patent No.: US 10,649,469 B2
(45) Date of Patent: May 12, 2020

(54) INDOOR MAPPING AND MODULAR CONTROL FOR UAVS AND OTHER AUTONOMOUS VEHICLES, AND ASSOCIATED SYSTEMS AND METHODS

(71) Applicant: VTRUS INC., Seattle, WA (US)

(72) Inventors: Renato Fernando Salas-Moreno, Seattle, WA (US); Carlos Rafael Sanchez, Seattle, WA (US); Jonathan David Lenoff, Seattle, WA (US)

(73) Assignee: VTRUS INC., Seattle, WA (US)

( * ) Notice: Subject to any disclaimer, the term of this patent is extended or adjusted under 35 U.S.C. 154(b) by 33 days.

(21) Appl. No.: 15/875,347

(22) Filed: Jan. 19, 2018

(65) Prior Publication Data
US 2018/0217614 A1 Aug. 2, 2018

Related U.S. Application Data

(60) Provisional application No. 62/448,365, filed on Jan. 19, 2017, provisional application No. 62/514,549, filed on Jun. 2, 2017.

(51) Int. Cl.
*G05D 1/00* (2006.01)
*B64C 39/02* (2006.01)
(Continued)

(52) U.S. Cl.
CPC ........... *G05D 1/101* (2013.01); *B64C 39/024* (2013.01); *B64D 47/08* (2013.01); *G01C 21/00* (2013.01);
(Continued)

(58) Field of Classification Search
CPC .......... G05D 1/00; G05D 1/102; B64C 39/00; B64C 39/02; B64C 39/024; G01C 21/00; G01C 21/206; B64D 47/00; B64D 47/08
See application file for complete search history.

(56) References Cited

U.S. PATENT DOCUMENTS

| | | | |
|---|---|---|---|
| 9,977,434 B2 * | 5/2018 | Mellinger, III | ........ G05D 1/101 |
| 2014/0018979 A1 * | 1/2014 | Goossen | .............. G08G 5/0034 |
| | | | 701/3 |

(Continued)

FOREIGN PATENT DOCUMENTS

| | | |
|---|---|---|
| WO | 2015182924 | 12/2015 |
| WO | 2016015301 | 2/2016 |

OTHER PUBLICATIONS

International Search Report and Written Opinion issued for PCT/US2018/014448 dated Jun. 26, 2018.
(Continued)

*Primary Examiner* — Yonel Beaulieu
(74) *Attorney, Agent, or Firm* — Perkins Coie LLP

(57) ABSTRACT

Indoor mapping and modular control for UAVs and other autonomous vehicles, and associated systems and methods. A representative unmanned aerial vehicle system includes a body, a propulsion system carried by the body, a sensor system carried by the body, and a controller carried at least in part by the body and operatively coupled to the propulsion system and the sensor system. The controller is programmed with instructions that, when executed, operate in a first autonomous mode and a second autonomous mode. In the first autonomous mode, the instructions autonomously direct the propulsion system to convey the body along a first route within an indoor environment. While the body travels along the first route, the instructions receive inputs from the sensor system corresponding to features of the indoor environment. The features are stored as part of a 3-D map. In the second autonomous mode, the instructions direct the propulsion system to convey the body along a second route within the indoor environment, based at least in part on the 3-D map, and direct performance of an operation on the second route.

28 Claims, 12 Drawing Sheets

(51) Int. Cl.
*B64D 47/08* (2006.01)
*G01C 21/00* (2006.01)
*G05D 1/10* (2006.01)
*G01C 21/20* (2006.01)

(52) U.S. Cl.
CPC ......... *G01C 21/206* (2013.01); *G05D 1/0088* (2013.01); *G05D 1/102* (2013.01); *B64C 2201/027* (2013.01); *B64C 2201/108* (2013.01); *B64C 2201/123* (2013.01); *B64C 2201/141* (2013.01)

(56) References Cited

U.S. PATENT DOCUMENTS

| | | |
|---|---|---|
| 2015/0197010 A1 | 7/2015 | Ruuspakka et al. |
| 2016/0001883 A1 | 1/2016 | Sanz et al. |
| 2016/0039540 A1 | 2/2016 | Wang |
| 2016/0070264 A1 | 3/2016 | Hu et al. |
| 2016/0129917 A1 | 5/2016 | Gariepy et al. |
| 2016/0144734 A1 | 5/2016 | Wang et al. |
| 2016/0376004 A1 | 12/2016 | Claridge et al. |
| 2016/0378110 A1 | 12/2016 | Phillips et al. |
| 2017/0212529 A1* | 7/2017 | Kumar ................. G01C 21/165 |
| 2017/0353943 A1* | 12/2017 | Skaaksrud ............ H04W 12/06 |
| 2017/0371353 A1* | 12/2017 | Millinger, III ......... G05D 1/101 |
| 2018/0217614 A1* | 8/2018 | Salas-Moreno ....... B64C 39/024 |

OTHER PUBLICATIONS

International Search Report and Written Opinion issued for PCT/US2018/014513 dated Jun. 22, 2018.
Rashed, Amier, "Airobotics Making Completely Autonomous Drones a Reality," found at http://3dinsider.com/airobotics-making-completely-autonomous-drones-a-reality/ posted on Jul. 5, 2017, 4 pages.
U.S. Appl. No. 15/875,375, filed Jan. 19, 2018 and titled "Automated Battery Servicing, Including Charging and Replacement, for Unmanned Aerial Vehicles, and Associated Systems and Methods".

* cited by examiner

# INDOOR MAPPING AND MODULAR CONTROL FOR UAVS AND OTHER AUTONOMOUS VEHICLES, AND ASSOCIATED SYSTEMS AND METHODS

CROSS-REFERENCE TO RELATED APPLICATIONS

The present application claims priority to U.S. Provisional Patent Application No. 62/488,365, filed on Jan. 19, 2017; and U.S. Provisional Patent Application No. 62/514,549, filed on Jun. 2, 2017; both of which are incorporated herein by reference in their entireties.

TECHNICAL FIELD

The present technology is directed generally to indoor mapping and modular control for UAVs and other autonomous vehicles, and associated systems and methods.

BACKGROUND

Unmanned aerial vehicles (UAVs) and other robotic vehicles have been developed to carry out a myriad of functions. To increase the autonomy of such vehicles, the industry continues to develop systems that allow the vehicles to sense and avoid obstructions around which they operate, and communicate with users and other associated personnel. However, there remains a need for continued development of such systems, and for improved techniques for developing, testing, and implementing such systems.

DETAILED DESCRIPTION

1.0 Overview

Figure 1:
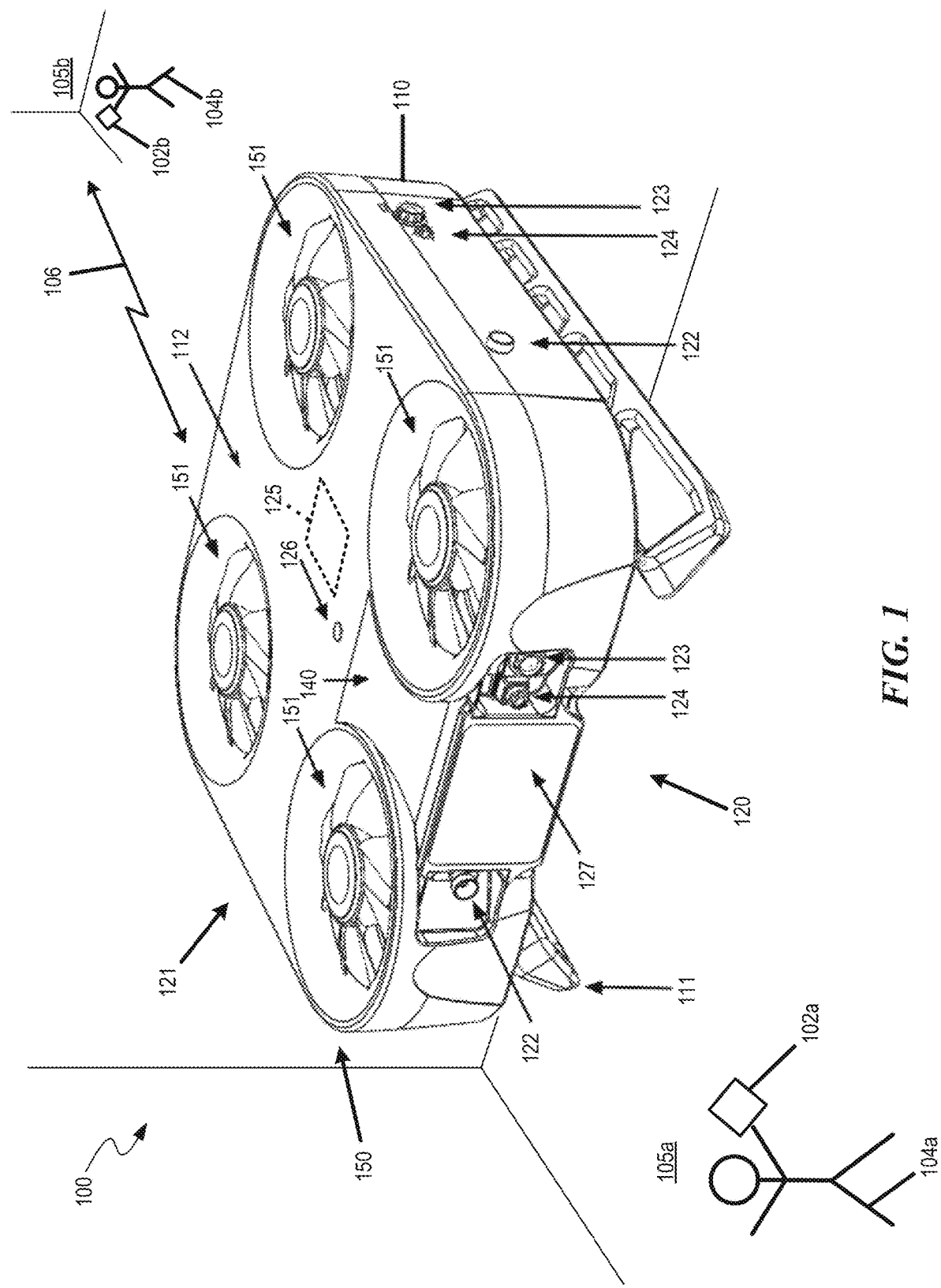
FIG. 1 is a partially schematic, isometric illustration of a representative unmanned system configured to operate in accordance with some embodiments of the present technology.

As the use of unmanned vehicles, systems, and/or robots continues to grow, the requirement to define the precise positions of physical components in relative space, particularly in indoor environments, has become increasingly important. Current methods for obtaining an object's precise positional information can be expensive and can require external infrastructure or sensors to be erected in the environment of interest ahead of time. The current methods may also require potentially continual precise calibration and human interaction.

Accordingly, some aspects of the present technology include using a compact, mobile, outward-looking vision system to provide and communicate spatial information that does not require external hardware or infrastructure to be implemented. This can allow for seamless implementation of the technology into any of a variety of new environments. Having the ability to precisely define the relative position of objects in 3-D space allows machines of varying dexterity (e.g., dynamic internet-based or "IOT" devices, robots, unmanned vehicles, and/or other autonomous or semi-autonomous devices) to have precise, meaningful locomotion. The ability to define an object's relative position in space with high precision can also enable a vast analytics potential from a particular vantage point by observation of the surrounding dynamic environment.

Aspects of the present technology are also directed to allowing two or more robots or other autonomous devices to reuse a previously created map to safely navigate an environment. The robots reusing the map may not require complex mapping capabilities (e.g. depth sensing techniques), thus simplifying the design and cost of such devices, leaving the more sophisticated mapping to other distributed devices.

Further aspects of the technology are directed to facilitating communication between two or more parties in real-time over the internet. One party (e.g., a "calling" party), who may not be physically located in proximity to an aerial vehicle, has the ability to remotely control the vehicle, which may be in proximity to another party (e.g., a "called" party), without concern for the safe and capable operation of the vehicle. The called party, who may be physically located in proximity to the vehicle, may also be able to watch and interact with the calling party who may not be in proximity to the vehicle, via a screen and/or other communication devices mounted on the vehicle.

Still further aspects of the present technology are directed to a modular control unit that is compact and has integrated sensors with local computing power, and a protective housing. The unit can accordingly include processing functionality (computing power), sensing functionality (e.g., cameras), other sensory and/or communication devices (e.g., microphones and/or speakers) and/or expressive features. A representative expressive feature includes a graphical representation of eyes (e.g., human eyes) that indicate where the unmanned system carrying the modular control unit will move. The generally compact design and low weight of the modular control unit can enable it to be mounted on a variety of platforms, including, but not limited to, aerial vehicles, ground vehicles and/or water vehicles.

Specific details of several embodiments of the present technology are described below with reference to one or more representative systems and/or devices to provide a thorough understanding of such systems and/or devices. In other embodiments, the systems and/or devices can have` other configurations. In still further embodiments, the technology can be practiced in connection with device configurations not expressly shown herein. Several details describing structures or processes that are well-known and often associated with autonomous systems, but that may unnecessarily obscure some significant aspects of the present technology, are not set forth in the following description for purposes of clarity. Moreover, although the following disclosure sets forth several embodiments of different aspects of the disclosed technology, several other embodiments can have different configurations and/or different components than those described herein. As such, the present technology may have other embodiments with additional elements, and/or without several of the elements described below with reference to FIGS. 1-8D.

Some embodiments of the disclosed technology may take the form of computer-executable instructions, including routines executed by a programmable computer or controller. Those skilled in the relevant art will appreciate that the technology can be practiced on computer or controller systems other than those shown and described herein. The technology can be embodied in a special-purpose computer, controller, or data processor that is specifically programmed, configured, or constructed to perform one or more of the computer-executable instructions described below. Accordingly, the terms "computer" and "controller" as generally used herein include a suitable data processor and can include internet appliances and hand-held devices, including palm-top computers, wearable computers, cellular or mobile phones, multi-processor systems, processor-based programmable consumer electronics, network computers, laptop computers, mini-computers, and the like. Information handled by these computers can be presented at any suitable display medium, including a liquid crystal display (LCD) and/or a touchscreen. As is known in the art, these computers and controllers commonly have various processors, memories (e.g., non-transitory computer-readable media), input/output devices, and/or other suitable features.

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the present technology are also encompassed within some embodiments of the present technology.

For purposes of organization, several of the foregoing topics are described below under particular headings. Aspects of the present technology described under any one of the headings below may be combined and/or implemented in conjunction with any suitable aspects described under the remaining headings, in a number of suitable manners. Selected combinations are also described below, without limitation to coverage of other suitable combinations.

2.0 Mapping and Operations

FIG. 1 is a partially schematic, isometric illustration of an unmanned vehicle system 100 configured to operate in an indoor environment 105*a*, in accordance with some embodiments of the present technology. As will be described further below, the unmanned vehicle system 100 can include an unmanned vehicle 110 that is configured to map the indoor environment 105*a* and operate within the indoor environment 105*a* to complete any of a variety of suitable tasks. The tasks can include, for example, sensing heat or other characteristics of the environment, providing visual information about the environment to personnel within or outside the environment, providing a communication link between the environment and personnel outside the environment, and/or other tasks. The process of mapping the indoor environment and performing operations in the indoor environment can be performed autonomously.

As used herein, the term "autonomously" refers to operations that are carried out by the unmanned vehicle 110 without direct input from an operator. An example of an autonomous operation is moving from one point within the environment to another, while avoiding objects within the environment and without an operator expressly directing the unmanned vehicle around such obstacles. An autonomous operation may be performed in conjunction with cooperation and non-autonomous input from an operator. For example, the operator may initiate the movement of the unmanned vehicle 110, from one point to another, or provide an instruction for the unmanned vehicle 110 to begin performing a task, without being involved in the details associated with the actual performance of the task.

Unless otherwise specified, the terms "unmanned vehicle," "unmanned system" and "robot" are used interchangeably to refer to devices that can carry out at least some tasks autonomously.

In a representative example shown in FIG. 1, the unmanned vehicle 110 includes an unmanned aerial vehicle, and, as will be described later with reference to FIGS. 8A-8D, can include other types of unmanned vehicles as well. In a representative example shown in FIG. 1, the unmanned vehicle 110 includes a body 112 that carries a propulsion system 150. The propulsion system 150 can include multiple propellers 151 arranged in a multi-copter configuration, to move the unmanned vehicle 110 within the environment 105*a*. The unmanned vehicle 110 can further include a controller 140 for controlling its operation, and multiple input/output devices 120 that facilitate interactions between the unmanned vehicle 110 and other devices/entities. The controller 140 can receive inputs from the input/output devices 120, provide outputs to other system elements, and direct the propulsion system 150 to move the unmanned vehicle 110. Accordingly, the controller 140 can include one or more processors, storage devices, and/or communication facilities.

The input/output devices 120 can include a sensor system 121. Representative input/output devices 120 within or outside the sensor system 121 can include multiple infrared emitters 122 and corresponding infrared sensors or cameras 123, and multiple color cameras 124. The unmanned vehicle 110 can include multiple emitters and cameras to provide access to and coverage of some or all of the indoor environment 105*a* from any suitable position or orientation of the unmanned vehicle 110. The emitters and cameras can be used for multiple types of imaging, and/or for determining depth and offset distances to facilitate navigation. Additional sensors 125 can be used to provide other information about the indoor environment 105*a*. Accordingly, the map produced by the unmanned vehicle can be three-dimensional in physical space, but can include other dimensions as well. Representative dimensions include temperature, humidity, chemical characteristics (which can be superimposed over the 3-D physical representation via shading, color, contour lines, or the like). Additional dimensions can also include time, e.g., with changes in any of the other dimensions represented as a function of time.

Other input/output devices 120 can include a multi-function button 126 that an operator 104a uses to initiate and/or halt operation of the unmanned vehicle 110, and/or a display 127 (e.g., a touchscreen display) that provides visual feedback to the operator 104a. For example, the operator 104a can use the display 127 to provide specific instructions to the unmanned vehicle 110. In addition to or in lieu of the display 127, the operator 104a can instruct or control the unmanned vehicle 110 via an offboard controller 102a.

The unmanned vehicle 110 can include retractable or non-retractable landing gear 111, and/or other features depending upon the mission the unmanned vehicle 110 is to carry out. For example, the unmanned vehicle 110 can include features for carrying removable or other payloads, and/or for grasping and/or manipulating objects in the environment 105a.

In some embodiments, the operator 104a can be a first operator, and a second operator 104b can also provide inputs to the unmanned vehicle 110 via a second offboard controller 102b and a communication link 106. In some embodiments, the second operator 104b can operate from a second indoor environment 105b, as will be described in further detail later under Heading 3.0.

Figure 2:
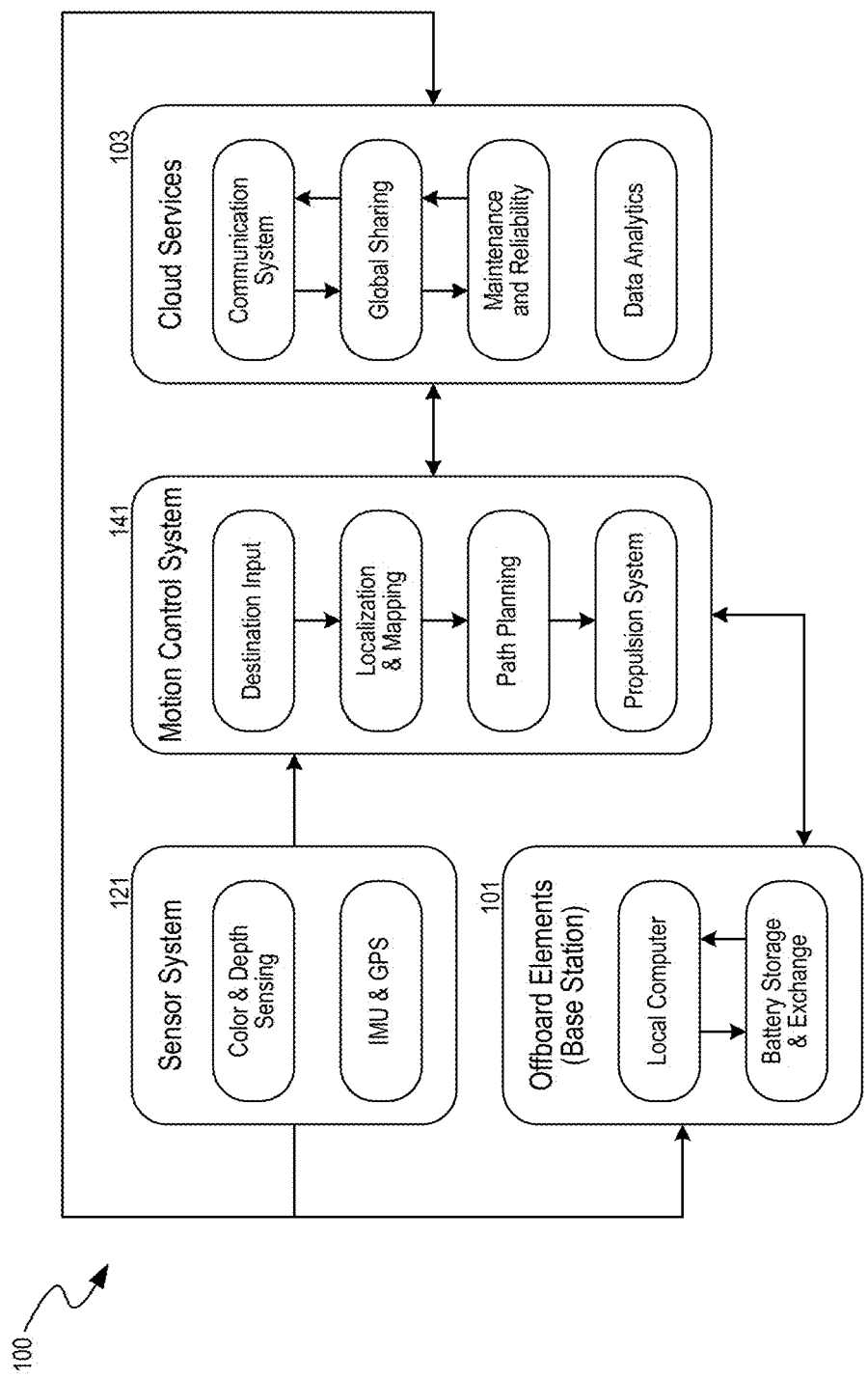
FIG. 2 is a block diagram illustrating representative functional features of unmanned systems configured in accordance with embodiments of the present technology.

FIG. 2 is a schematic block diagram illustrating representative inter-relationships between several of the elements described above with reference to FIG. 1. As described above with reference to FIG. 1, the sensor system 121 can include one or more sensors that provide data used to, (among other functions), estimate the device state of the unmanned vehicle, for example, the position and orientation (or pose) of the unmanned vehicle, with a high degree of accuracy. For example, the position and orientation of the unmanned vehicle can be determined to within millimeter accuracy. The sensor system 121 itself can combine data from multiple sources, and/or this function can be performed by the controller 140 (FIG. 1). The sensor system 121 can be used to monitor the health of one or more components of the unmanned vehicle 110, e.g., in real time. In some embodiments, the sensor system 121 can include one or more cameras or other sensors that provide color and depth sensing. For example, the sensors can measure color intensity and/or depth, and can be arranged on the unmanned vehicle to increase (e.g., optimize) the field of view captured by the unmanned vehicle. Further sensors can include one or more GPS (Global Positioning System) units and/or IMU (Inertial Measurement Units), further including magnetometers, accelerometers, gyroscopes, and/or other elements.

The overall system 100 can include a motion control system 141, that can in turn be incorporated into the controller 140 described above with reference to FIG. 1. The motion control system 141 can receive instructions to navigate to a desired location or perform another action. The action may be facilitated by cloud services 103. The motion control system 141 can also estimate the position and orientation of the unmanned vehicle 110, e.g., via the sensor system 121, as described above. This localization and mapping function can include building a 3-D map of the environment around the unmanned vehicle in real time or near real time, which can allow the unmanned vehicle to immediately perform operations within the environment it has just mapped. This is unlike some conventional technologies, which require time delayed, and/or offboard processing to produce a 3-D map suitable for navigation and conducting operations in the environment in which the unmanned vehicle operates.

The motion control system 141 can use the localization and mapping function to plan paths within the environment and control the unmanned vehicle within the environment, while achieving one or more goals, including avoiding obstacles within the environment, reaching one or more targets within the environment with maximum speed, minimum distance, and/or other parameter constraints. These motions are provided by the propulsion system which, as described above, can include propellers powered by electric motors (which are themselves under the control of an Electronic Speed Control (ESC) module). In some embodiments, the propulsion system can include other elements, as described later.

The overall system 100 can include offboard elements 101, such as a base station and/or other elements that are located off the unmanned vehicle 110. Such elements can include a local computer which can supplement the processing resources provided by the onboard controller 140 and that may be used to provide a communication link between the unmanned vehicle 110 and the cloud services 103. In other embodiments, the unmanned vehicle 110 can communicate directly with the cloud services 103. The offboard elements 101 can also include the offboard controllers 102a, 102b described above with reference to FIG. 1.

The offboard elements 101 can further include a battery storage and exchange facility that can be used to recharge and/or swap batteries to permit uninterrupted or nearly uninterrupted operation of the unmanned vehicle 110. Further details are described in pending U.S. application Ser. No. 15/875,375, filed Jan. 19, 2018, titled "Automated Battery Servicing, Including Charging and Replacement, for Unmanned Aerial Vehicles, and Associated Systems and Methods," filed concurrently herewith, and incorporated herein by reference. The system 100 can include a monitoring module (e.g., onboard or offboard the unmanned vehicle 110) that communicates with the local computer to assess and/or maximize the lifetime of the onboard batteries carried by the unmanned vehicle 110.

The cloud services 103 can supplement the functions provided by the onboard controller 140 (FIG. 1) and/or the offboard elements 101. The cloud services 103 can include a communications system that connects features of the unmanned vehicle 110 to parties remote from the unmanned vehicle 110. For example, the communication system can provide real-time visual and aural communication between the unmanned vehicle 110 and parties located in close proximity to the unmanned vehicle 110, and/or remotely from the unmanned vehicle 110. A global sharing subsystem can be used to show users or others associated with the unmanned vehicle 110 where any of a plurality of unmanned vehicles 110 are located and which vehicles may have the ability and/or state of readiness to be operated remotely. As will be described later under Heading 3.0, operators can control the unmanned vehicle 110 remotely to provide enhanced communication between people in remote locations.

The cloud services facility 103 can further include a maintenance and reliability subsystem that monitors system-wide performance (e.g., not just performance associated with a single unmanned vehicle 110 alone) to identify issues that may impact run-time in physical environments (e.g., the health of the unmanned vehicle 110 including, but not limited to the battery state) and/or data environments (e.g., as a result of data storage limitations, connectivity speeds, algorithmic bottlenecks, usage statistics, among others).

A data analytics subsystem can consolidate sensory data from multiple unmanned vehicles 110 to provide a globally consistent map of the environments that have been mapped or otherwise explored by one or more unmanned vehicles 110. This information can include time varying 3-D surfaces and/or real-time localization information. The data analytics subsystem can also be used to process and distribute information on other factors, such as raw sensor values or the activity characteristics of multiple unmanned vehicles, again, on a multi-vehicle, system-wide basis.

The unmanned systems described herein can operate in multiple modes, including a first or exploration mode of in which the system explores, learns, and/or maps the environment in which it operates, and a second or execution mode, in which the system performs actions in the environment it has learned and/or mapped. Each mode is described in turn below with reference to FIGS. 3 and 4, respectively.

Figure 3:
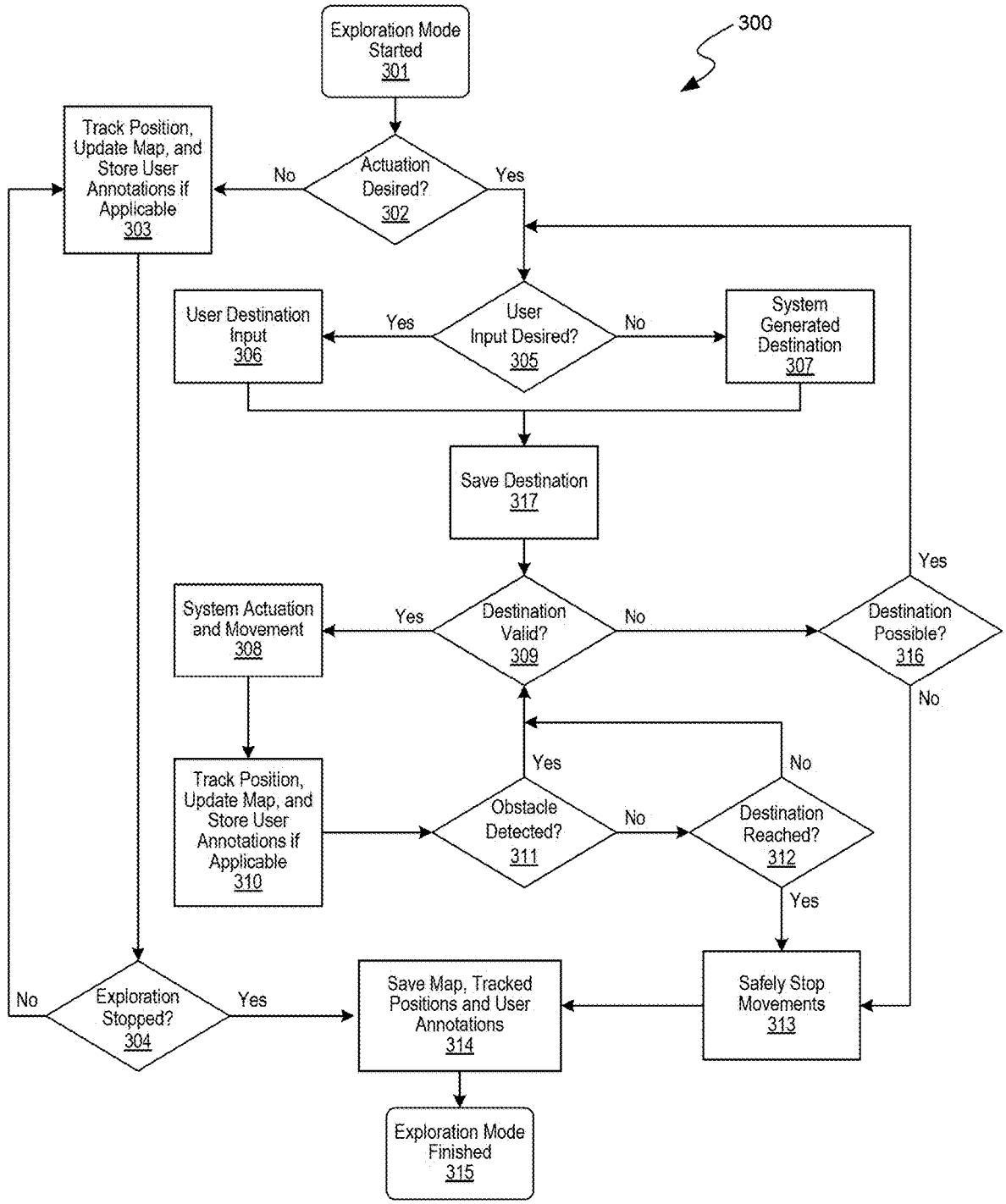
FIG. 3 is a flow diagram illustrating a representative process for mapping an indoor environment in accordance with embodiments of the present technology.

Beginning with FIG. 3, a process 300 in accordance with the first mode can include starting operation (block 301). Initiating the first mode can include initiating formation of a 3-dimensional map of an environment, with or without some previous information regarding the environment. At block 302, the process includes determining whether the system actuates the motion performed during the first mode, or whether the motion is out carried otherwise (e.g. manually). If the system is to actuate its own movements, it will move under its own power through its own propulsion system. To do so, the system will require a target or destination, which can be user-generated or system-generated (determined at block 305). If the user provides the destination (block 306) the user uses any suitable input/output device to do so. If no user input is used, then the system can generate its own destination (block 307) so as to explore the environment. Whether the destination is obtained from the user or via the system, it is saved at block 317.

At block 309, the system determines whether the destination is valid. For example, a valid destination is one that is at least potentially reachable, while an invalid destination is one that is unreachable. A representative valid destination includes a position within a room, and a representative invalid destination may include a position within the thickness of a wall of the room or a position determined to be too close to an obstacle such that the unmanned vehicle 100 could not safely function. If the destination is not valid, the system then determines if any destination is possible. Any destination is not possible if the vehicle cannot move from its current position. If a destination is possible (block 316), the system seeks a new, valid destination. If the destination is not possible (block 316), then the system safely stops its movements (block 313), saves the data collected to that point (block 314) and completes the first mode (block 315).

If, on the other hand, the destination is valid, then the system will actuate its movement (block 308) as it moves in the direction of the destination. As the system moves, it will track its position, update the map, and store any user annotations (block 310). Representative user annotations can include, but are not limited to descriptions of the current location (for example, with phrases such as "kitchen"), and/or desired actions to take place at a particular location. For example, a representative notation can include indicating that the location is one suitable for taking a picture or recording sensor data such as humidity, Wi-Fi signal strength, and/or parameters.

As the system moves, it continually searches for obstacles (block 311). Suitable techniques for object avoidance include motion planning with the use of motion primitives. One representative method includes using sensor inputs (e.g. camera frames, sonar, and/or infrared signals) to detect an obstacle. If an obstacle is detected, the system can check to see if the saved destination is still valid (block 309), given the new information collected since last determining whether the destination is valid. If the destination remains valid, the system navigates around the obstacle and continues to block 312 to determine if the destination has been reached. Blocks 309 through 312 are iterated until the system reaches its destination at which point the process moves to block 313 and 314, discussed above.

Returning to block 302, if the operator does not wish the system to operate under its own power, the system may still be moved by another method, for example, by the user holding the system and simply moving around. In this instance, the system can simply track its position, update its map, and store any user annotations (block 303), as the user moves the system around, and until the user stops the exploration mode (block 304).

The foregoing method described above with reference to FIG. 3 produces a high fidelity, 3-D representation of an indoor environment, or a portion of the environment. In general, the more extensively the system travels within the environment, the more comprehensive the map. Whether the map is completely comprehensive or not, the system can perform operations at least in the portions of the environment that it has mapped, as described further below with preference to FIG. 4.

Figure 4:
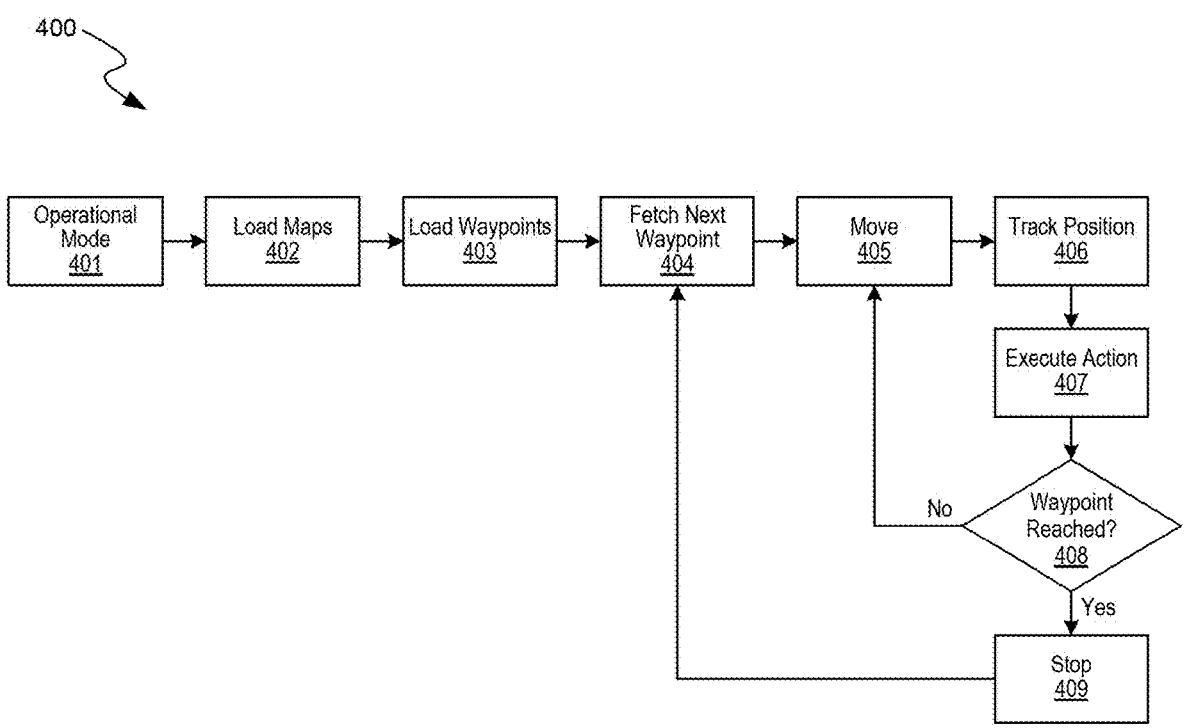
FIG. 4 is a block diagram illustrating a technique for operating an unmanned vehicle in a mapped, indoor environment.

FIG. 4 illustrates a representative process 400 in accordance with the second mode. At block 401, the second operation mode is initiated. At block 402, any necessary maps are loaded, and at block 403, waypoints are loaded. The waypoints can correspond to a path identified by an operator (or otherwise received) along which the unmanned vehicle will travel to perform its operation. At block 404, the next waypoint is retrieved and at block 405, the unmanned vehicle moves to the next waypoint. At block 406, the unmanned vehicle tracks its position and in block 407, executes an action. For example, the unmanned vehicle can take pictures along the route at selected locations, and/or identify parameters other than 3-D spatial parameters (e.g. heat, humidity, gas concentration, and/or others). At block 408, the system checks to see if the waypoint has been reached, and if not, returns to block 405. Once the waypoint is reached, the process proceeds to block 409 and returns to block 404 to fetch the next waypoint. This process can be repeated for as many waypoints as an operator wishes.

FIG. 4 illustrates one of many possible arrangements for directing the unmanned vehicle to perform one or more tasks. Each of these operations can be performed with a suitable level of autonomy, ranging from completely autonomous (no interaction by the user) to semi-autonomous (with only high-level inputs provided by the user) to manual (with the user moving the vehicle). When the unmanned vehicle reaches a particular location, it performs the operation with or without user input once it gets there.

Figure 5:
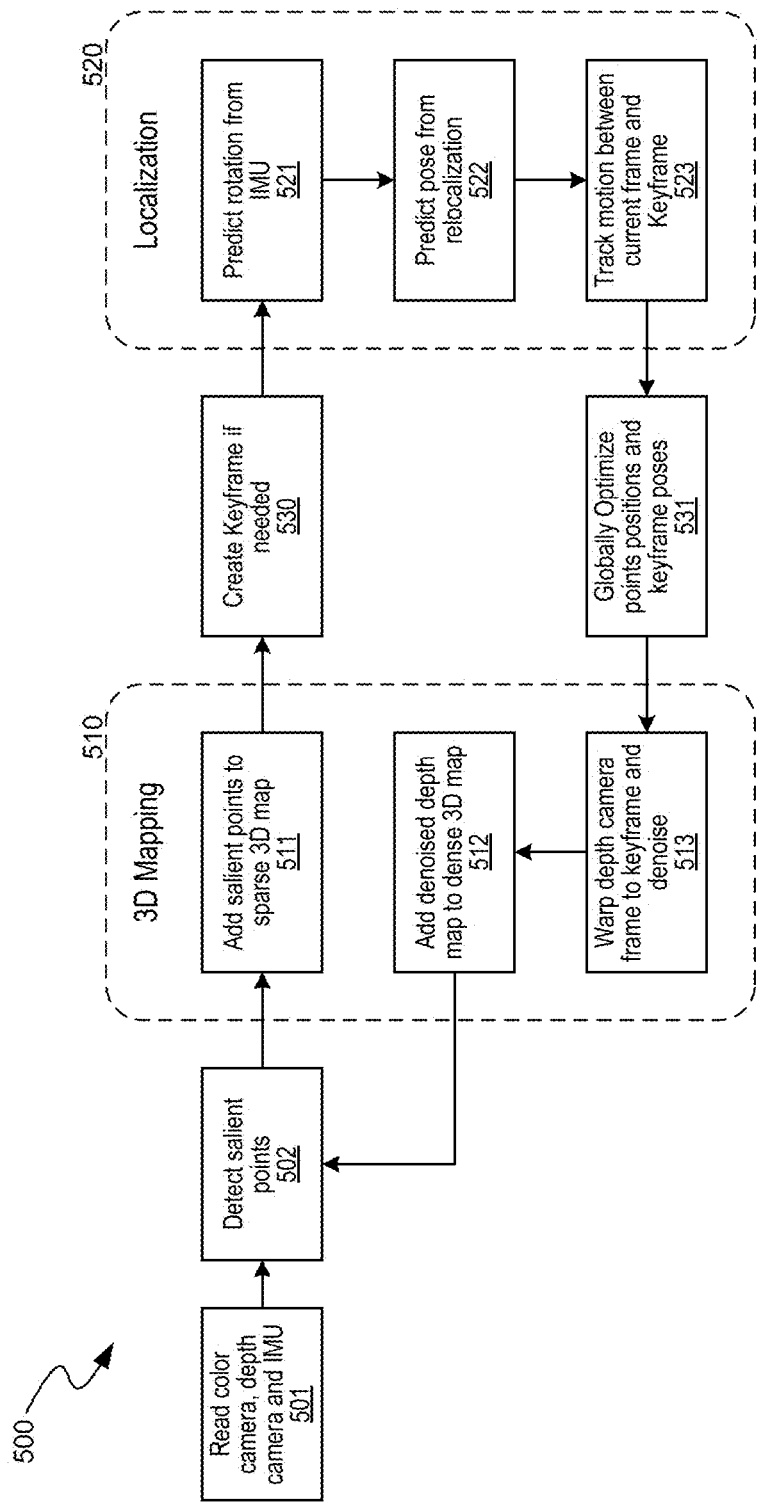
FIG. 5 is a flow diagram illustrating a process for mapping and localizing an unmanned vehicle in accordance with embodiments of the present technology.

FIG. 5 illustrates a representative process 500 for mapping the environment in which the unmanned vehicle operates, and localizing the vehicle in the environment. This process can include a hybrid sparse-dense formulation that can produce significantly improved results when compared to conventional systems. For example, the system can provide fast and accurate motion tracking using a sparse set of salient points obtained from color cameras, and/or other suitable input devices on a low power processor. The system can then efficiently provide high quality, dense 3-D mapping by fusing denoised raw depth measurements obtained from a depth camera with other suitable input devices.

At block 501, the process includes reading sensor data, for example, from one or more color cameras, depth cameras, and/or IMUs. The data from the color and depth cameras, which relate to a rendition of the environment in which the unmanned vehicle is located, and the IMU data, which provides inertial measurements, can be fused to determine the position and/or orientation of the unmanned vehicle.

In order to determine if the camera has changed its pose, the system looks at the data within the camera images. For example, if we assume that the environment around the camera does not change, any change in the image obtained from a camera can be explained by a change in a camera's pose. To simplify solving for the new pose of the camera, the system uses only a limited set of pixels which may be representative of the picture as a whole in order to limit the number of computations necessary. This limited set of pixels are known as salient points and are identified using feature detection algorithms, such as FAST, at block 502. At block 502, the process includes detecting salient points from the color camera frames, for example using the FAST feature detection algorithm. For example, in a representative FAST algorithm, the salient points are distinct areas where a group of pixels are brighter than an arbitrary reference pixel. The found salient points are then uniquely identified using binary descriptors such as the ORB point descriptor algorithm, allowing quick matching at multiple scales and orientations. Block 510 includes creating or updating the 3 D map using the information obtained at blocks 501 and 502. For example, block 511 includes adding salient points to a sparse 3D map. The salient points can be stored associated to a key frame and anchored to a particular location and, if the unmanned vehicle has moved sufficiently between salient points from the last key frame, a new keyframe is generated (block 530). Each keyframe can include a subset of points visible to the camera at a particular vantage point in time, and with a predicted (e.g. best) pose (block 523). The pose is predicted because, as new measurements come in, the position and/or orientation estimate can be improved. Instructions for computing the extent of the next movement, if any, of the camera are obtained by comparing new salient points against the most recent keyframe, for example, by solving an iterative non-linear least squares optimization problem, with pose variables as the optimal solution, seeking to minimize the reprojection error of matching salient points. The new pose of the camera is obtained by comparing the apparent motion of 2D salient points detected on the color camera frame and the projected 3D salient points stored in the 3D sparse map associated to the most recent keyframe. If the camera has not moved, the detected salient points and projected 3D salient points will coincide. When the camera moves, there exists a reprojection error. Solving the new camera pose in 3D space explains the reprojection error observed.

The IMU measurements allow the integration of inertial information that is used to predict the motion of the robot. However, IMU measurements are typically prone to drift and as such may not provide reliable information. Accordingly, the reliability of the IMU data can be improved by fusing the prediction with the motion obtained from the color cameras, for example, using an extended Kalman filter algorithm (block 521).

In at least some situations, the unmanned vehicle may become lost, for example, due to a lack of salient points, sensor errors, or re-initiation after the unmanned vehicle has experienced a power loss. To account for such situations, the system can include a relocalization procedure (block 522) that looks for unique digital signatures of salient points at each keyframe, for example, using the Bags of Words algorithm. With the unique digital signatures, the robot can reliably recall a visited place and its pose at that location. At block 523, the system tracks its motion from the recalled keyframe to its current frame.

At block 531, the process can include globally optimizing the point's position and poses of key frames, for example, using a Bundle Adjustment algorithm. This approach can be used to obtain positions and poses with minimal reprojection error. This global optimization is typically required, as the pose computed in block 523 only had local information to take into consideration and therefore may be prone to error accumulation known as drift. In order to compensate for this drift, the system will optimize its estimate of its current and past positions using all the available measurements contained in a loop. A loop occurs when the system recognizes that it has returned to a position after a period of neglect.

The data optimized at block 531 is then incorporated into the 3-D map at blocks 513 and 512. For example, at block 513 the process includes warping raw noisy depth measurements from a depth sensor to the closest keyframe. Overlapping depth samples can be denoised by averaging them, e.g. with a weight factor that takes into account sensor noise properties, such as distance and viewing direction. This is typically required as depth cameras, such as structured light cameras, provide reliable measurements and close to the direction of the optical axis. As distances to surfaces and angles off the optical axis increase the depth measurement error increases. Repeated measurements can be averaged to provide a more accurate measurement. Once the quality of the denoised depth frame reaches a pre-established quality threshold, for example, once the variation of the corresponding averaged depth measurements is less than 2 mm from the previous iteration, or a maximum number of iterations has been reached, it is fused into a dense 3-D map (at block 512) and the process returns to block 502 to detect further salient points. The dense 3-D map generated using this process is then used by the unmanned vehicle to navigate the environment, for example, in the manner described above with reference to FIG. 4. The distinction between a dense and sparse 3D map refers to the density of points in a given volume. A dense 3D map allows one to identify objects, for example, a cup on a large table or a sock on the ground, or surfaces that may not be identifiable with fewer points in a given volume.

One feature of at least some of the embodiments described above is the process of denoising the data at the keyframe level. This approach allows the process to correct drift errors before the data are integrated into the 3-D map. Accordingly, this approach is unlike some conventional techniques, in which raw data are fused directly into the 3-D map, which inhibits later correction of the data. An advantage of embodiments of the present technology is that the 3-D map can be made more accurate, without consuming significantly increased computing resources.

3.0 Communications

Being able to experience different places remotely, in real-time, as if the operator is actually there, has been a goal of developers for many years, with implementations ranging from global communication devices, such as smartphones or tablets, to wheeled, telepresence robots. Smartphones and tablets provided real-time communications between two or more parties using a combination of components, such as microphones, cameras, screens and system connectivity. While the information exchanged during a session using such devices is certainly useful, the calling party is unable to experience and explore the environment in which the called party is located.

The foregoing limitation has in some cases been at least partially overcome via the use of wheeled telepresence robots which, in addition to the foregoing components, can navigate using wheels in accordance with instructions provided by the caller. However, such systems are constrained to operate in a 2-D plane, and accordingly, may be difficult to maneuver in areas where motion by a wheeled vehicle is too limited.

Accordingly, in at least some embodiments of the present technology, an unmanned aerial vehicle is used to provide real-time communication between remote users, with motion that is not constrained to a 2-D plane. For example, returning to FIG. 1, the first operator 104a in the first environment 105a can correspond to a "called" party, and can provide control over the unmanned vehicle 110 in the first environment 105a via the first offboard controller 102a. The second operator 104b, located in the second environment 105b, can correspond to a "calling" party and can control the unmanned vehicle 110 via the second offboard controller 102b. Using the mapping and obstacle avoidance techniques described above, the unmanned vehicle 110 can operate in the first environment 105a under the control of the second operator 104b located in the second environment 105b. Accordingly, the second operator 105b can use the unmanned vehicle to explore the first environment 105a in which the called party 104a is located.

In particular embodiments, the overall system 100 can include deconfliction software, for example, to allow the first operator 104a (who is located in close proximity to the unmanned vehicle 110) to override instructions provided by the more remote second operator 104b. In this manner, the calling party (e.g. the second operator 104b) can not only communicate with the called party (e.g. the first operator 104a), but can use the unmanned vehicle 110 to explore the environment in which the called party is located. The calling party can be in a different room, a different building, a different country or a different continent than the called party, as long as a suitable communication link 106 can be established and maintained between devices in the two environments 105a, 105b.

4.0 Modular Control Units

In some embodiments of the present technology, the unmanned systems can have a modular arrangement, and can include a modular control unit, e.g., a robotic "head," for localizing, mapping, and controlling robots and/or other autonomous or semi-autonomous systems, including vehicles and/or other platforms. In particular embodiments, the device can include a modular unit that can be easily attached to any of a wide variety of robotic platforms, including unmanned aerial vehicles (UAVs), ground-based vehicles, and/or water-based vehicles. The device can make use of universal or otherwise widely disseminated connection and/or communication technologies to provide compatibility with a wide variety of robotic platforms.

In some embodiments, the modular control unit can provide localization, 3-D map creation, and/or centrally stored or sharing functionalities (as described above with reference to FIGS. 1-5), that can enable cooperation between or among two or more devices. Accordingly, the devices can share common environmental representations, allowing multiple devices to self-track from a common reference point.

Figure 6A:
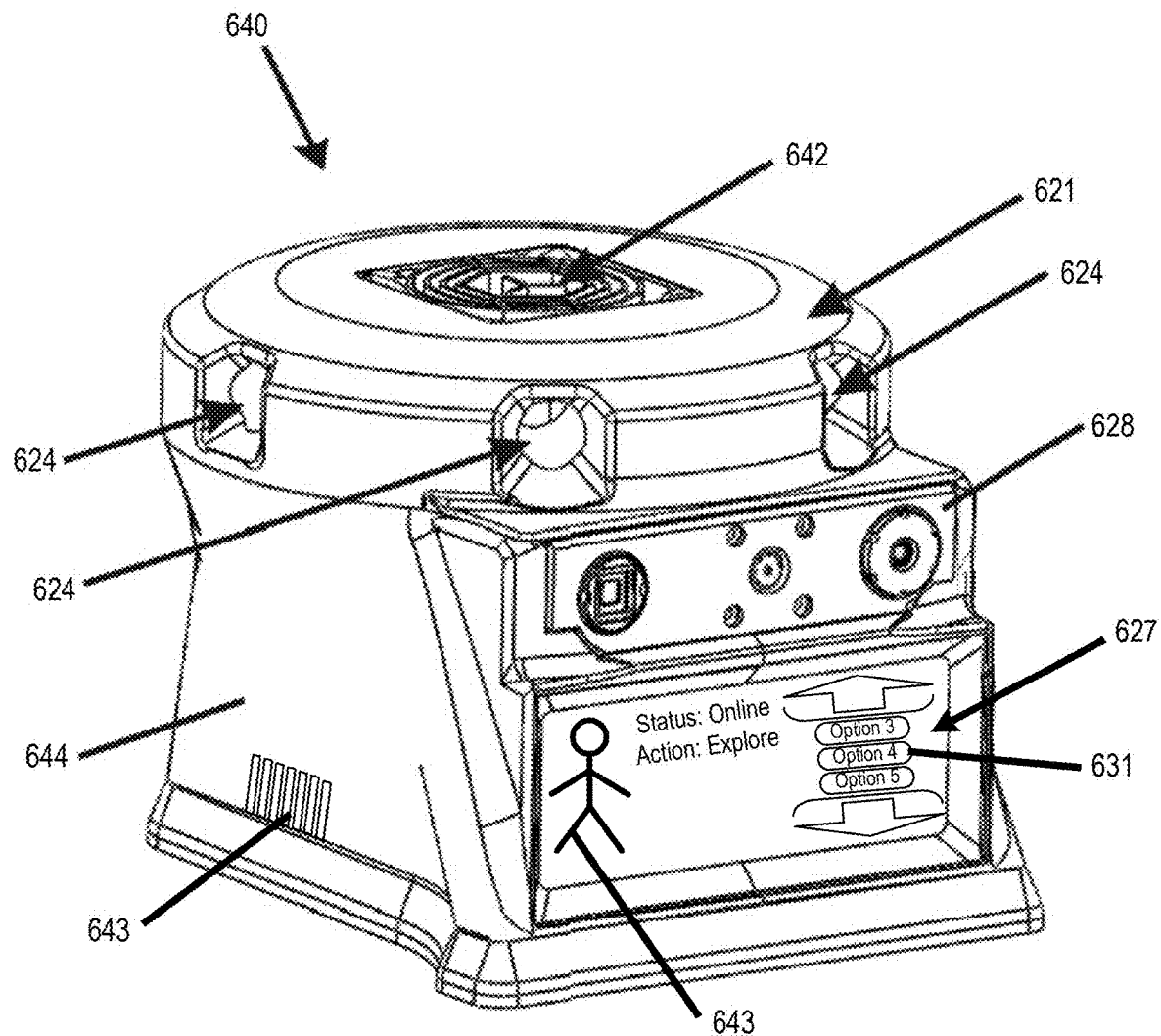
FIG. 6A is a partially schematic, isometric illustration of a modular control unit configured in accordance with some embodiments of the present technology.

As seen in FIG. 6A, a representative modular control unit 640 can have the form of a robotic "head" that in turn includes a protective body or housing 644. The housing 644 can be modular in that it can be carried by a variety of different platforms (e.g., mobile air, ground and/or water-based vehicles). The housing 644 can provide a structural support for one or more sensors of a sensor system 621. For example, the sensor system 621 can include multiple cameras 624. In a particular embodiment, the sensor system 621 can include an array of six cameras 624, three of which are visible in FIG. 1 and all six of which are organized to provide (e.g., maximize) the three-dimensional field of view of (a) each camera separately and (b) the system as a whole.

The modular control unit 640 can also include one or more depth sensors 628, configured to measure distances to objects, e.g., at a pixel level. In some embodiments, the housing 644 promotes dissipation of heat generated by internal components though a series of baffles and/or vents 643, and/or a cooling fan 642.

In some embodiments, the modular control unit 640 can include a display element or screen 627, which may have a touch input portion 631 to control the control unit 640 and/or a platform that carries the control unit 640. The display element 627 can also be used to present images or other information 643, e.g., in the form of a graphical user interface. The information can correspond to aspects in the environment surrounding the control unit 640 (and/or the platform on which the control unit 640 is carried), operational aspects of the control unit 640 (and/or the associated platform), and/or other information. In another embodiment, the modular control unit 640 can also connect to an external mobile device, such as a phone, for viewing graphics or interfacing. Because the dimensions and/or capabilities of the mounted screen may be limited due to weight and/or size considerations, an external mobile accessory, such as a phone, tablet, or laptop, can extend the capabilities of the modular control unit 640 by allowing (a) increased screen real estate and resolution to provide data to the user from the device, (b) additional input to the device via the mobile accessory (whether directly from the user or simply as a gateway) and/or (c) advantages to the operator as the accessory may be physically closer and/or easier to use depending on the device location and current action. The display element 627 can contribute to the operation of the overall platform, e.g., by allowing the control unit 640 to display a simulated emotion and/or convey intention to people around it. Conveying intention can aid the communication and cooperation of humans and machines. By way of an example, and as outlined above, a pair of eyes can be displayed on the display element 627, and when the eyes look in a particular direction, that can indicate to those around the platform where the platform will move next. In another example, the eyes are replaced with arrows or another suitably intuitive symbol. This type of clear communication can help robots and humans safely and effectively interact.

Figure 6B:
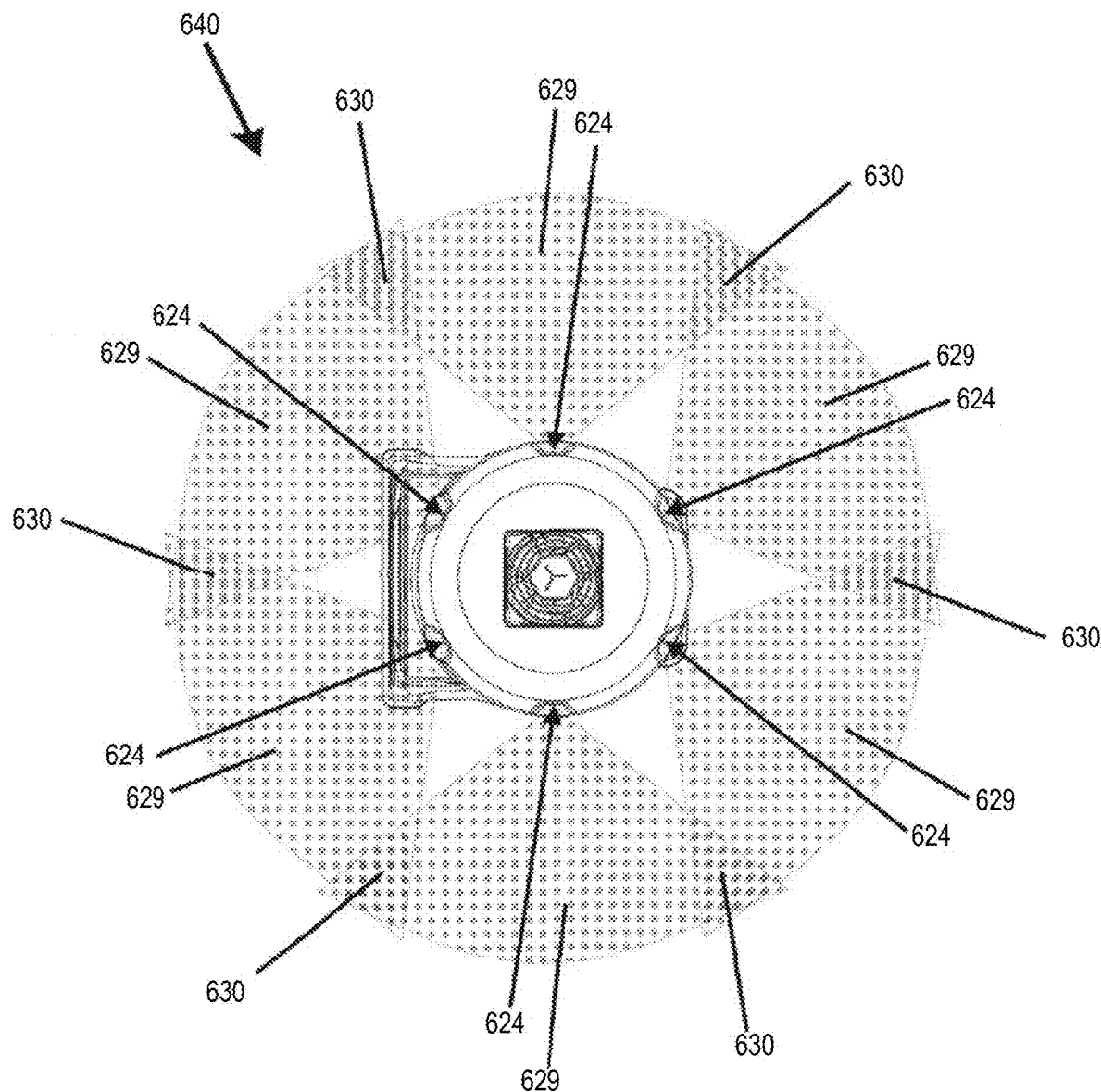
FIG. 6B is a top-down view of a representative modular control unit illustrating multiple sensor fields of view and overlapping sensor fields of view, in accordance with embodiments of the present technology.

FIG. 6B illustrates the modular control unit 640 from above, showing the six camera 624, corresponding fields of view 629, and overlap regions 630 between neighboring fields of view 629. The overlap regions 630 can provide additional functionality including, but not limited to three-dimensional data collection. The corresponding cameras 624 can allow data collection in and of the environment surrounding the modular control unit 640. In other embodiments, the modular control unit 640 can include other numbers of cameras (e.g., from one to twelve cameras) that are sensitive to visible light and/or other electromagnetic wavelengths, and that may be arranged to cover a full 360 degree field of view.

Figure 7:
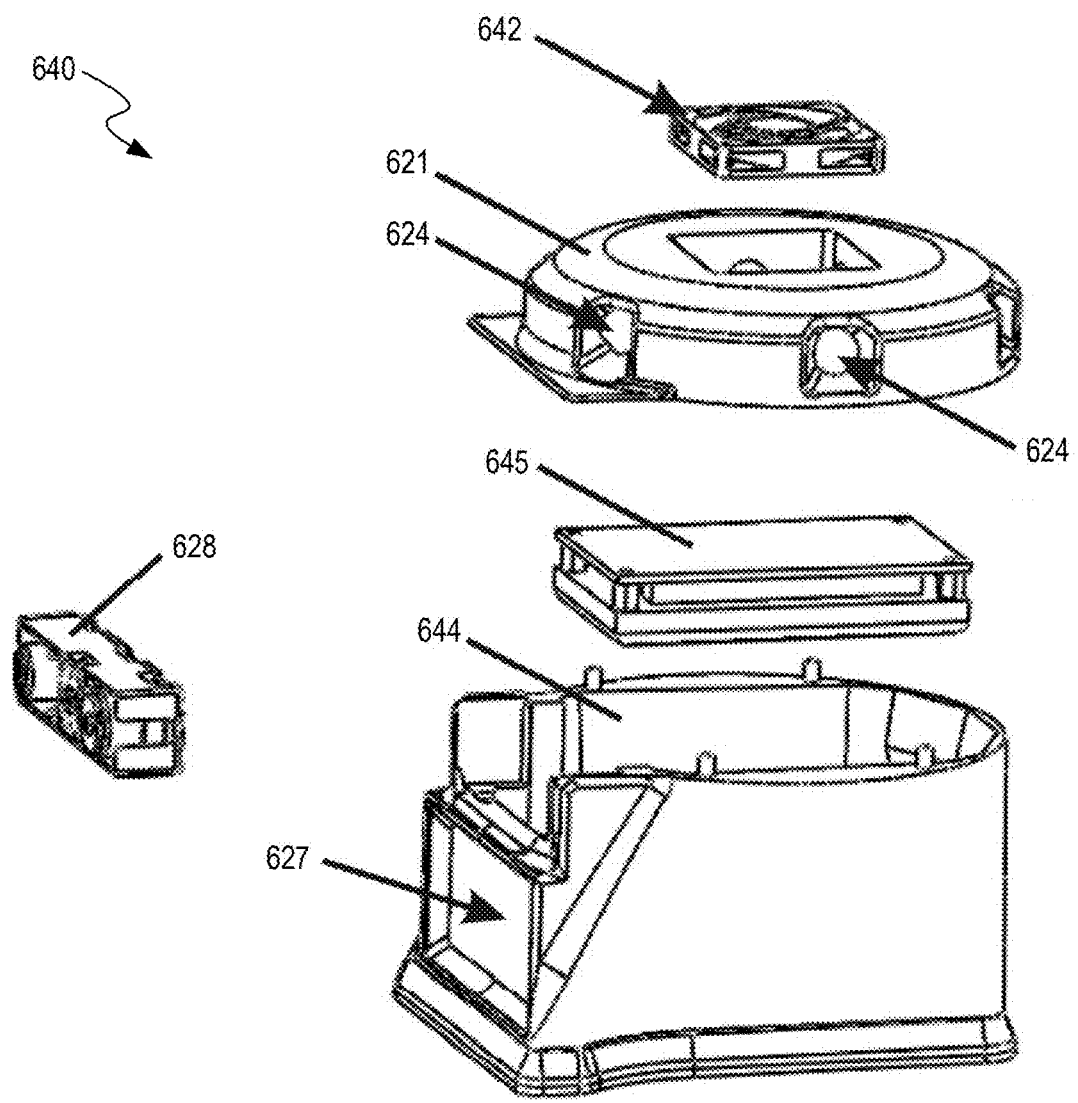
FIG. 7 is a partially schematic, exploded illustration of a modular control unit configured in accordance with embodiments of the present technology.

FIG. 7 is an exploded view of the modular control unit 640 illustrating, among other components, an electronics unit 645. The electronics unit 645 can support and/or facilitate operation of the other components of the modular control unit 640 and/or the platform to which it is connected. Accordingly, the electronics unit 645 can include any one or more of a variety of microprocessors, microcontrollers, and/or other components. Additional sensors, including but not limited to, an IMU, GPS unit and/or thermal sensor may be included in the electronics unit 645, which can also provide additional functions, including data processing, mapping, and navigation functions. By way of example, the software integrated into the electronics unit 645 can control the supporting platform, as well as any of the associated locomotion or controlling elements described further below with reference to FIGS. 8A-8D. Representative software is available from Pixhawk (www.pixhawk.org). The software can be used tune the control of the supporting platforms through a combination of the electronics unit 645 and the on-board sensors. Automatic tuning can be accomplished as the movement of the supporting platform can be fully characterized in comparison against the actual control of the wheels propellers and/or other propulsion devices. For example, because the device inputs can be controlled (e.g., through motor commands), and the system response (e.g., bank angle) can be determined, it is possible to characterize the system for a set of inputs such that there is an expected output. With such a system characterization, an operator or manufacturer can choose the correct tuning constants for a desired response. In situations where system model parameters (e.g., vehicle mass, wheel diameter, motor location, etc.) change, or are initially unknown, it is generally necessary to automatically tune for improved (e.g., optimal) performance.

In some embodiments, the supporting electronics unit 645 can also include a battery or energy storage system that powers the modular control unit 645. In some embodiments, the battery or energy storage system can be used to provide power to elements other than the modular control unit 640, e.g., the supporting platforms described below with reference to in FIGS. 8A-8D. In other embodiments, the modular control unit 640 can obtain power from the platform, or power can be shared between the modular control unit 640 and the platform, depending on the power needs and supplies for each. In a representative embodiment, the modular control unit 640 uses approximately 10-15 watts of power.

FIGS. 8A-8D illustrate a representative modular control unit 640 installed on (e.g., mechanically and releasably attached to) a number of suitable platforms, e.g. unmanned vehicles 810, shown in FIGS. 8A-8D as unmanned vehicles 810a-810d. Beginning with FIG. 8A a representative unmanned vehicle 810a includes an aerial vehicle having a body 812a and a propulsion system 850a that includes multiple propellers 851. The body 812a is configured to be releasably attached to the modular control unit 640, which provides direction and control for the overall unmanned vehicle 810a via the propulsion system 850a and/or other system components.

Figure 8A:
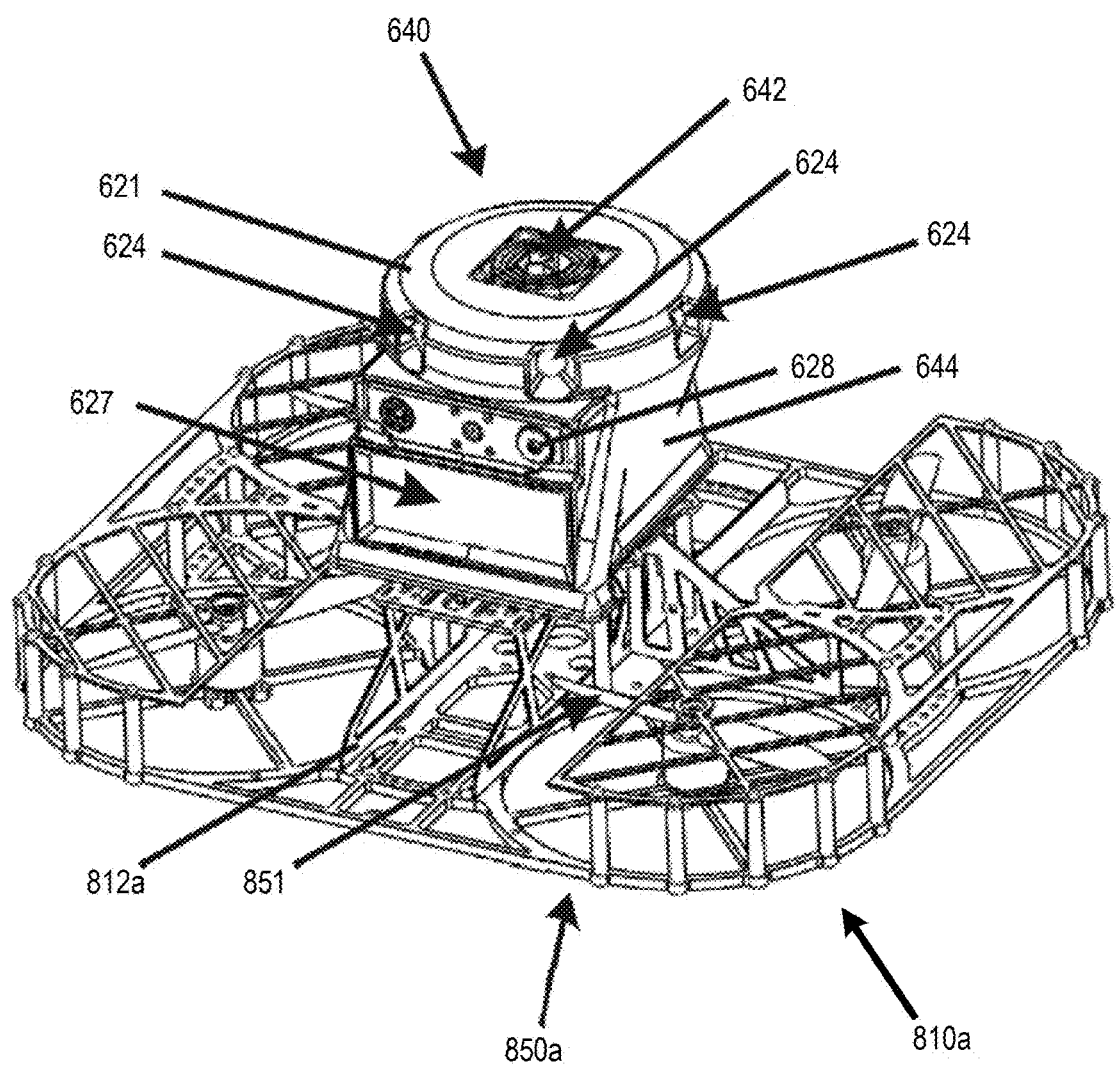
FIGS. 8A-8D illustrate a representative modular control unit installed on multiple different types of unmanned vehicles, in accordance with embodiments of the present technology.
Figure 8B:
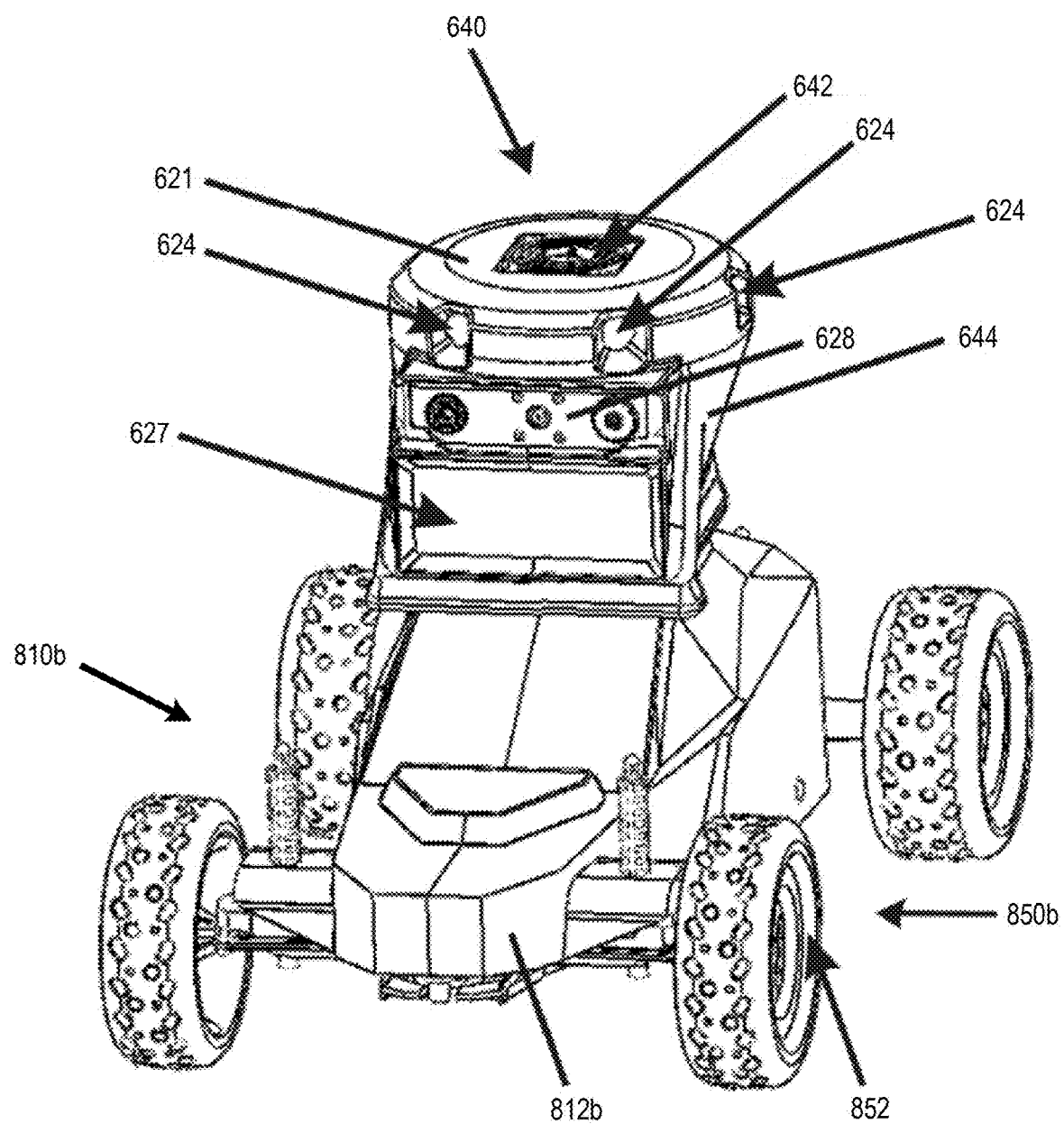

FIG. 8B illustrates a representative unmanned vehicle 810b that includes a body 812b and a ground-based propulsion system 850b, including multiple wheels 852. The modular control unit 640 is releasably attached to the body 812b to control the propulsion system 850b and/or other systems, including an Ackermann (or other) steering system for the wheels 852.

Figure 8C:
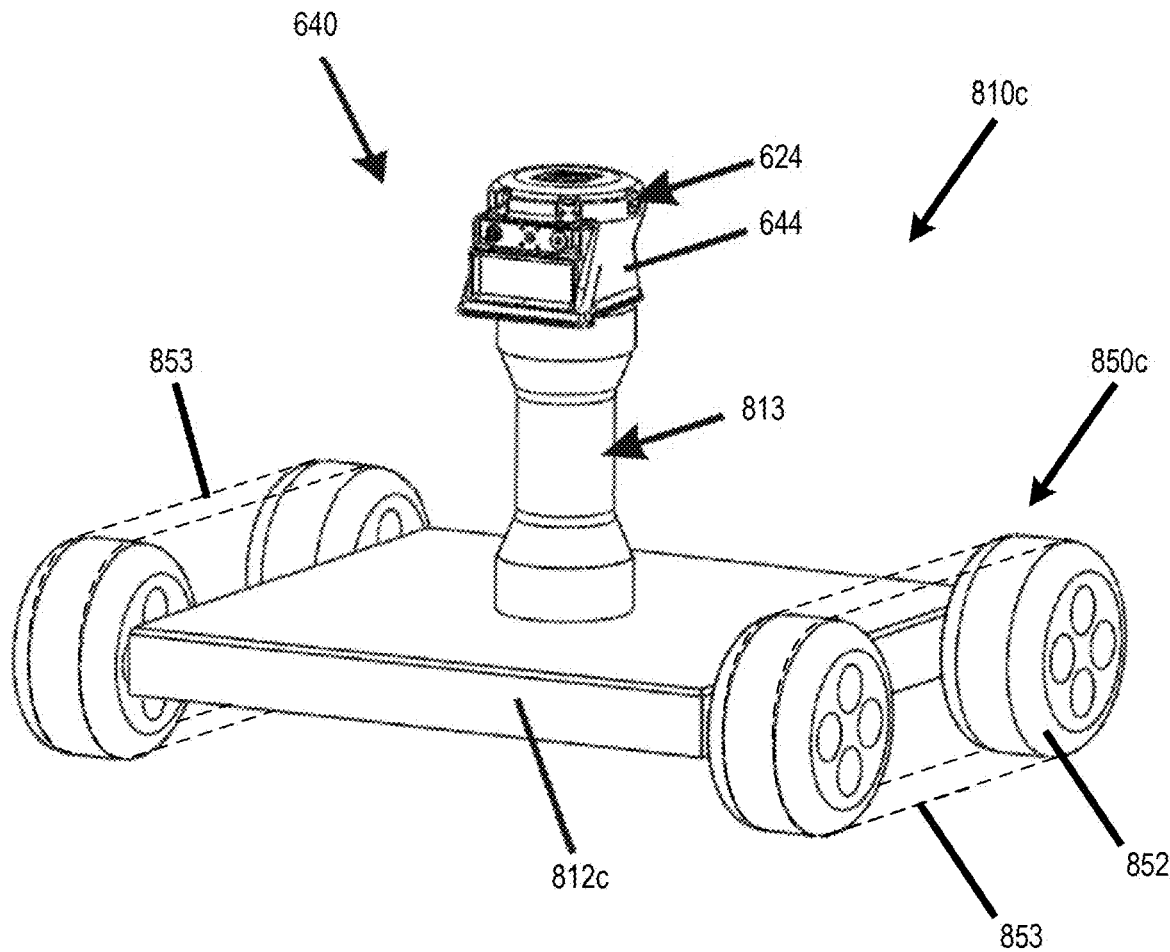

FIG. 8C illustrates still another representative unmanned vehicle 810c having a body 812c carrying a propulsion system 850c with multiple wheels 852. In a particular aspect of this embodiment, the unmanned vehicle 810c can further include treads 853 so as to operate in a skid steer manner, which may be simpler to implement than the standard Ackermann steering arrangement as shown in FIG. 8B. The body 812c can further include an intermediate structure 813 that supports the modular control unit 640 in an elevated position for additional visibility of the surrounding environment.

Figure 8D:
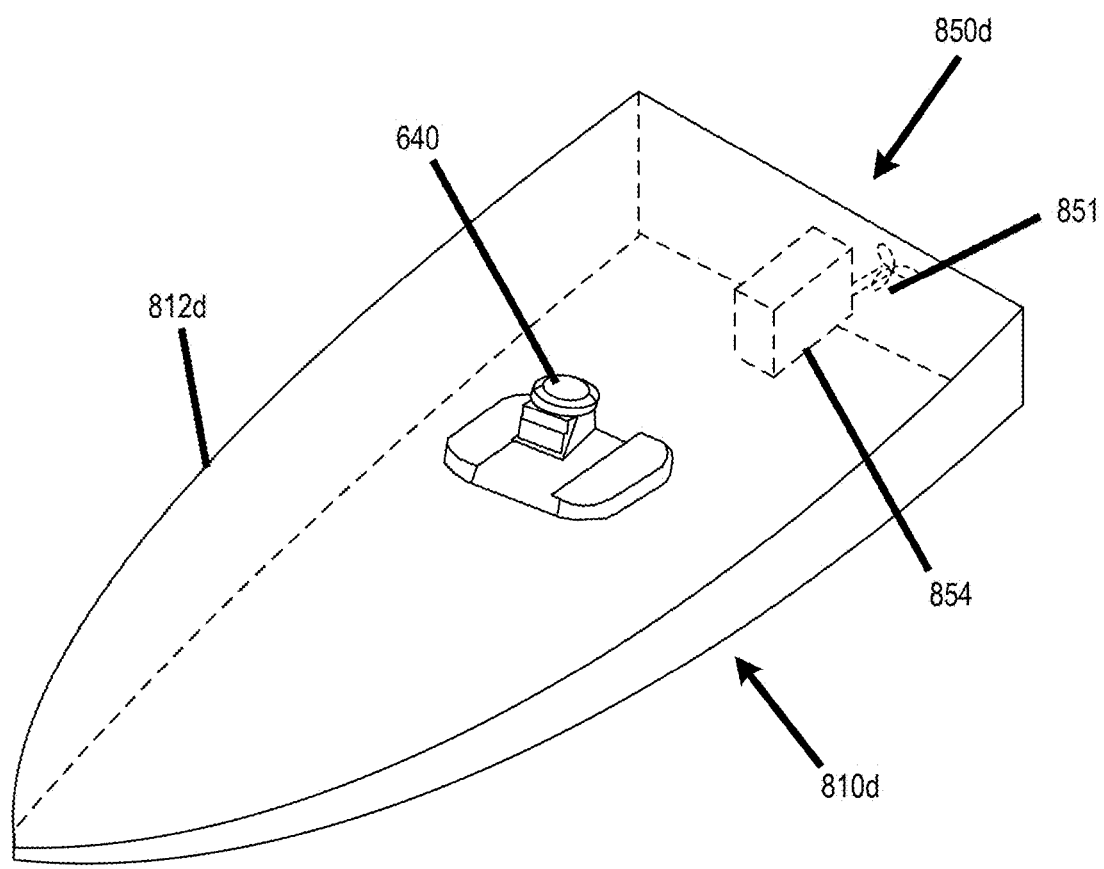

FIG. 8D illustrates still a further unmanned vehicle 810d having a body 812d in the form of a boat hull. The corresponding propulsion system 850d can include a motor 854 that drives one or more propellers 851. The modular control unit 640 is removably carried by the body 812d. In still further embodiments, the modular control unit 640 can be used in conjunction with other types of unmanned vehicles. For example, the water-borne vehicle can be submersible, in addition to or in lieu of operating at the surface as shown in FIG. 8D.

Several features of representative embodiments have been described above. The following sections expand upon the description presented above, and/or introduce additional features of the disclosed technology.

In general, the disclosed technology can include a modular control unit that can be used across a variety of different platforms (aerial, ground-based, and/or water-based). By providing common elements in a modular system, embodiments of the present technology can make the process of developing new systems and/or porting technology from one type of autonomous platform to another easier. The output from the modular control unit can include motor commands (e.g., commands to move the platform that carries the modular control unit in a particular direction and/or by a particular amount), visual data (e.g., data corresponding to obstructions and/or other features in the environment in which the platform operates), depth data (which can accompany the visual data and can add a third dimension to data that may otherwise be two-dimensional), and/or other suitable parameters (e.g., platform velocity, acceleration, orientation, and/or direction of travel). The foregoing information can provide the platform with the ability to identify its position and track its motion over time. These features can have applicability to platforms operating in a wide variety of environments, including indoor environments, where close quarters require accurate information, short signal transmission latencies, and a self-contained information gathering capability in what is typically a GPS-denied location.

To facilitate its modular nature, the modular control unit 640 can include standardized interfaces and/or communication protocols. For example, the modular control unit 640 can include three conductors or cables: one for ground, one for power, and one for signal data (e.g., low level digital input/output, or other suitable data). Each of the cables can be coupled to a standardized connector that interfaces with a corresponding connector at the body and/or the intermediate structure. In particular embodiments, the foregoing connections (ground, power and signal) are simple enough that any of a wide variety of connectors can be used to interface with the vehicle platform. In particular embodiments, the system is not deliberately designed to retrofit to existing systems, while in other embodiments, the system can include connector interfaces that are specifically intended for retrofits. In any of these embodiments, suitable communication protocols include, but are not limited to, SPI, I2C, USB, UART, Bluetooth, and Wi-Fi, among others.

In general, the housing 644 in which the device components are carried can be made relatively small and light-weight so as to be compatible with a wide variety of vehicles or other platforms. In a particular embodiment, the modular control unit 640 is small and light enough to be carried and used by a UAV having an overall footprint of approximately 12 inches by 12 inches or more. In other embodiments, the modular control unit 640 can be used with smaller and/or larger UAVs.

Representative platforms (e.g., unmanned vehicles) suitable for carrying devices in accordance with the present technology include radio controlled race cars, and other ground-based vehicles, as well as UAVs. When coupled to ground-based vehicles, the device can provide instructions for controlling the wheels and steering of the vehicle. When coupled to a UAV, the device can provide instructions for controlling propellers and/or other propulsion devices, as well as flight control surfaces and/or other steering or directional control devices. In any of these embodiments, the device can include a processor and a microcontroller that, alone or in combination, issue commands to corresponding devices of the platform. For example, the commands can be directed to an actuator, or to an electronic motor controller (EMC), which act on the commands to produce changes in direction, speed, and/or other attributes of the vehicle. The commands are expected to be simple and/or generic enough that they can apply to, and be understood by, any of the platforms on which the device is carried.

The foregoing operations can take place in a semi-autonomous context, or in a fully autonomous context. For example, a representative semi-autonomous context includes a mode in which a human operator instructs the unmanned vehicle to "go left" or "go right" or "back up", and the modular control unit implements these instructions. In a representative fully autonomous mode, the operator can enter a destination, or it can simply instruct the unmanned vehicle to "go". The modular control unit can direct the unmanned vehicle to the destination, or instruct the unmanned vehicle to begin exploring its environment. In both cases, the modular control unit assumes responsibility for directing the unmanned vehicle in a way that avoids obstacles in the environment, e.g., based on the data obtained from the on-board cameras and/or depth sensor(s). In particular embodiments, the modular control unit can operate in accordance with a hierarchical organization of instructions. For example, the modular control unit can be programmed to avoid obstacles despite contrary instructions received from a human operator.

In still further embodiments, the modular control unit can direct other operations of the platform. For example, if the platform includes manipulator arms or other devices configured to execute tasks other than propelling or guiding the platform, the modular control unit can be used to provide commands for such actions.

The unmanned vehicle can carry any of a variety of suitable payloads. For example, the unmanned vehicle can carry one or more cameras or other sensors for capturing data regarding the environment in which the unmanned vehicle operates. Such sensors can be in addition to the cameras and/or other sensors carried by the modular control unit 640. In other embodiments, the unmanned vehicle can deliver packages or other payloads. In still another embodiment, the unmanned vehicle can carry human passengers. For example, the unmanned vehicle can include a wheelchair, with the modular control unit providing autonomous or semi-autonomous commands to guide the wheelchair. In still a further embodiment, the modular control unit can be carried by a person. For example, the person can operate as a mapping unit, taking instructions from the modular control unit which guides the person around an environment. In still a further embodiment, the person can be blind, and can rely on or use the modular control unit to guide him or herself in the environment. The modular control unit can be coupled to a speaker, buzzer, and/or other component that provides feedback to the person in a manner that guides the person around the environment.

At a high level, the information provided by the modular control unit can be used to identify where the modular control unit is and how the modular control unit moves in time. This can in turn include visual data, including depth data, and velocity and acceleration data. In further embodiments, the instructions can include motor commands that direct the platform (which carries the modular control unit) to move in particular directions or to particular locations. In other embodiments, the motor commands can be eliminated or replaced with other information, for example, information used to guide a blind person in an environment, as discussed above.

In a representative embodiment, the sensor system 621 described above with reference to FIG. 6A include six visible light cameras 624, and a depth sensor 628. The depth sensor 628 can in turn include a sensor/receiver (e.g., a LiDAR or IR sensor/receiver) combined with a color camera that adds visual information to the depth information captured by the sensor/receiver. The information gathered by the visible light cameras can be stitched together (e.g., using conventional techniques) to provide a visual representation of the environment around the unmanned vehicle. In some embodiments, this information can be presented at a flat screen, or a virtual reality display, or another suitable output device (for example, a user's phone), in addition to being used by the device for modular control unit and navigation. Other sensors can include a barometer, a GPS sensor, a thermal sensor, and/or other suitable sensors, depending upon the mission to be carried out by the unmanned vehicle, and/or the environment in which the unmanned vehicle operates. In general, these sensors operate independently of any sensing capability performed by the payload carried by the unmanned vehicle. For example, the unmanned vehicle may carry a payload camera that is used to take specific still images or videos, while the modular control unit 640 uses its visual data for guidance and navigation. In other embodiments, however, the data gathered by the modular control unit 640 may be used for other purposes in addition to navigation and guidance, including operating as a payload, or supplementing the data provided by the payload, or building a map database, as described in further detail later.

In particular embodiments, the cameras 624 are used to provide an "inside out" localization process. Using this process, the modular control unit 640 can extract landmarks from the local environment, and produce a sparse map, as discussed above with reference to FIG. 5. If landmarks are lacking, fiducials can be deliberately placed in the environment to facilitate this process. The sparse map can then be used as the basis for further map definition. For example, once the tracking information is obtained from the localization process, it can be used to resolve the position and orientation of the depth sensor and the modular control unit 640 as a whole such that collected depth information can be properly registered into a map. The data obtained via this process can also be used to interpolate or extrapolate to vantage points other than the vantage point from which the information is initially obtained.

As discussed above, visual cameras alone are not typically sufficient for obtaining depth information, particularly in the relatively untextured, in terms of color variation or geometric detail, environments that are typically encountered indoors. Accordingly, the modular control unit 640 can include the depth sensor described above. In other embodiments, other techniques can be used to obtain depth information, for example, via the overlap produced by the visual fields of closely spaced cameras, as illustrated in FIG. 6B. In some embodiments, the visual images provided by the cameras can be enhanced by adding more cameras, which can reduce distortion. The optical characteristics of the cameras can be selected to be quite precise, again, due to the resolution required for indoor operation in close quarters. In particular, the optics can be used to resolve features on a millimeter level.

In particular embodiments, the data obtained by the modular control unit 640 can be uploaded to a central location and updated with additional relevant data. For example, the modular control unit 640 can create a map, which is uploaded to the cloud (or another centralized database) and then used by the same platform that carries the device, or by another platform. In a representative scenario, a platform captures an image (or other information) corresponding to its surroundings. If the information is sufficient to determine the location of the modular control unit 640, then the platform accesses an appropriate map (from the central location) and uses the map to navigate. If the information is insufficient to determine the location of the device, then the modular control unit 640 itself gathers more information until its location can be determined. During this process, new information gathered by the modular control unit 640 can be compared to the previously defined map until a location match is identified. Once its location is determined, then it can use the previously loaded map information for navigation and/or other purposes. The degree to which the foregoing operations are carried out on-board the modular control unit 640 or off-board the modular control unit 640 (e.g., in the cloud) can be established based on factors that include the power and speed required for carrying out the operations, and the available power on-board the modular control unit 640 and/or the associated platform. More generally, calculations and operations that are latency-sensitive can be selected to be carried out on-board, and less time-critical operations can be carried out off-board. Information typically considered latency-sensitive includes altitude information, platform and/or device orientation, SLAM (simultaneous localization and mapping) data, and/or other near-proximity mapping data.

In one example, a device (or a person) can be placed in a foreign environment, such as an unfamiliar airport. The operator loads an initial view of the environment to the centralized database where it is compared with existing data. If the initial view is sufficient to identify the location, then the operator can access a map to provide context and help guide the operator's subsequent movements. If the initial view is insufficient, then the operator continues gathering and uploading data until a match is found.

In particular embodiments, devices configured in accordance with any of the foregoing characteristics can be particularly suitable for robotics systems developers. In particular, it is expected that the modularity and interoperability characteristics described above can be particularly suitable for such applications. However, the present technology is not limited to such applications. For example, modular devices having any of the foregoing characteristics and/or attributes can be suitable for commercial-scale, industrial-scale, and/or military-scale applications.

From the foregoing, it will be appreciated that specific embodiments of the present technology have been described herein for purposes of illustration, but that various modifications may be made without deviating from the present technology. For example, the systems and devices illustrated herein may have configurations other than those specifically shown. The unmanned vehicle can have a helicopter or a fixed wing configuration. The vehicle can include a row of sequentially lit LEDs, or a similar arrangement, in lieu of the display screen, to indicate an upcoming travel direction. The controller can autonomously override a user input, e.g., when the controller determines that the user input would cause damage to the vehicle. The communication link can be wired as opposed to wireless (e.g., Bluetooth). When the UAV is mapping and/or operating in an indoor environment, the operator (or operators) can be located in an outdoor environment, and can interface with the UAV via a controller that is not located indoors.

Certain aspects of the technology described in the context of particular embodiments may be combined or eliminated in other embodiments. For example, functions provided by multiple elements (e.g., multiple cameras) in some embodiments may be combined into a single element (e.g., a single camera). Functions described in the context of a modular control unit that are not unique to the modular nature of the control unit may also be carried out by non-modular control units. In at least some embodiments, some features (e.g., the modular control unit) can be used outdoors as well as or in lieu of being used indoors. When used indoors, the autonomous action of the vehicle is typically constrained, e.g., to a 10 foot by 10 foot area, or another volume/area circumscribed by the walls, floor, doors, windows, and ceiling of the indoor environment. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the phrase "and/or" as in "A and/or B" refers to A alone, B alone and both A and B. To the extent any materials incorporated herein by reference conflict with the present disclosure, the present disclosure controls.

We claim:
1. An unmanned aerial vehicle system, comprising:
   a body;
   a propulsion system carried by the body;
   a sensor system carried by the body; and
   a controller carried at least in part by the body, and operatively; coupled to the propulsion system and the sensor system, the controller being programmed with instructions that, when executed:
   operate in a first autonomous mode, during which the instructions:
      autonomously direct the propulsion system to convey the body along a first route within an indoor environment;
      while the body travels along the first route, receive inputs from the sensor system corresponding to features of the indoor environment;
      store the features of the indoor environment as part of a 3-D map; and
      denoise received inputs at multiple keyframes prior to updating the 3-D map with the data; and
   operate in a second autonomous mode during which the instructions:

direct the propulsion system to convey the body along a second route within the indoor environment, based at least in part on the 3-D map; and direct performance of an operation on the second route.

2. The unmanned aerial vehicle system of claim 1 wherein the sensor system and the controller are contained in a modular unit that is removable, as a unit, from the body.

3. The unmanned aerial vehicle system of claim 1 wherein the propulsion system includes a plurality of propellers.

4. The unmanned aerial vehicle system of claim 1 wherein the sensor system includes at least one of a color camera, a depth sensor, an inertial measurement unit, or a GPS unit.

5. The unmanned aerial vehicle system of claim 1, further comprising a touchscreen display carried by the body.

6. The unmanned aerial vehicle system of claim 1, further comprising a display screen carried by the body, and wherein the instructions, when executed, present an image at the display screen indicative of an upcoming travel direction of the body.

7. The unmanned aerial vehicle system of claim 6 wherein the indication includes a depiction of an eye.

8. The unmanned aerial vehicle system of claim 1, further comprising a microphone carried by the body.

9. The unmanned aerial vehicle system of claim 1 wherein the sensor system includes a microphone.

10. The unmanned vehicle system of claim 1 wherein the sensor system includes a camera, and wherein the operation includes activating the camera.

11. An unmanned aerial vehicle system, comprising:
a body;
a propulsion system carried by the body;
a sensor system carried by the body;
a first controller carried at least in part by the body, and operatively coupled to the propulsion system and the sensor system, the first controller being programmed with instructions that, when executed:
operate in a first autonomous mode, during which the instructions:
autonomously direct the propulsion system to convey the body along a first route within an indoor environment;
while the body travels along the first route, receive inputs from the sensor system corresponding to features of the indoor environment; and
store the features of the indoor environment as part of a 3-D map; and
operate in a second autonomous mode during which the instructions:
direct the propulsion system to convey the body along a second route within the indoor environment, based at least in part on the 3-D map; and
direct performance of an operation on the second route; and
a second controller configured to operably couple to the propulsion system and the sensor system via a wireless communication link.

12. The unmanned aerial vehicle system of claim 1 wherein the first controller is configured to autonomously override a user input.

13. An unmanned aerial vehicle system, comprising:
a body;
a propulsion system carried by the body, the propulsion system including a plurality of propellers;
a sensor system carried by the body; and
a controller carried at least in part by the body, and operatively coupled to the propulsion system and the sensor system, the controller being programmed with instructions that, when executed:
operate in a first autonomous mode, during which the instructions:
receive a destination within an indoor environment;
determine whether the destination is reachable;
if the destination is reachable:
autonomously direct the propulsion system to convey the body to the destination;
while enroute to the destination, receive inputs from the sensor system to identify an obstacle;
if an obstacle is detected, direct the propulsion system to convey the body so as to avoid the obstacle;
while enroute to the destination, receive inputs from the sensor corresponding to features of the indoor location; and
store the features of the indoor location as part of a 3-D map; and
operate in a second autonomous mode during which the instructions:
receive a series of waypoints;
serially and autonomously direct the propulsion system to convey the body to the waypoints; and
at individual waypoints, direct the sensor system to carry out an operation.

14. The system of claim 13 wherein the instructions direct a camera of the sensor system to capture a visual image.

15. A method for operating unmanned aerial vehicle (UAV), comprising:
in a first autonomous mode:
autonomously directing a propulsion system of the UAV to convey the UAV along a first route within an indoor environment;
while the UAV travels along the first route, receiving inputs from a sensor system of the UAV corresponding to features of the indoor environment; and storing the features of the indoor location as part of a 3-D map;
in a second autonomous mode:
autonomously directing the propulsion system to convey the UAV along a second route within the indoor environment, based at least in part on the 3-D map; and
directing the UAV to perform an operation along the second route.

16. The method of claim 15 wherein autonomously directing the propulsion system includes directing the propulsion system in a manner to avoid obstacles.

17. The method of claim 15 wherein the indoor environment is a first environment, and wherein the method further comprises:
receiving instructions from an operator in a second environment different than the first, to operate the UAV in the first environment; and
directing motion of the UAV in the first environment, in accordance with the instructions and the 3-D map.

18. The method of claim 17 wherein the first indoor environment is in a first building and the second indoor environment is in a second building different than the first.

19. The method of claim 17 wherein the operator uses the UAV to provide two-way communication between the operator and a person in the first indoor environment.

20. The method of claim 17 wherein the operator is a second operator, and wherein the method further comprises receiving instructions from a first operator in the first indoor environment to operate in the UAV in the first indoor environment.

21. The method of claim 15 wherein the UAV is a first UAV, and wherein the method further comprises making the 3-D map accessible to a second UAV.

22. An unmanned vehicle system, comprising:
a modular control unit removably and mechanically connectable to and carryable by, multiple types of unmanned vehicles, wherein the multiple types of unmanned vehicles include at least two from the group comprising unmanned aerial vehicles, unmanned land vehicles, and unmanned water vehicles, the control unit including:
a housing;
at least one sensor carried by the housing;
a controller carried by the housing and coupled to the at least one visual sensor; and
a communication link coupled to the processor and releasably coupleable to the multiple types of unmanned vehicles;
wherein the controller is programmed with instructions that, when executed:
identify elements in an environment in which the multiple types of unmanned vehicles operate; and
direct motion of the multiple types of unmanned vehicles.

23. The unmanned vehicle system of claim 22 wherein the multiple types of unmanned vehicles include a multirotor aerial vehicle, and a skid steer ground vehicle.

24. The unmanned vehicle system of claim 22, further comprising an unmanned vehicle, and wherein the modular control unit is removably and mechanically connected to the unmanned vehicle.

25. The unmanned vehicle system of claim 22 wherein at least one sensor includes at least one camera.

26. The unmanned vehicle system of claim 22 wherein the at least one sensor includes a depth sensor.

27. A method for controlling multiple types of unmanned vehicle systems, comprising:
mechanically connecting a removable modular control unit to a first unmanned vehicle;
while the modular control unit is carried by the first unmanned vehicle, controlling motion of the first unmanned vehicle via at least one sensor carried by the modular control unit, at least one processor carried by the modular control unit and coupled to the at least one sensor, and a communication link coupled between the modular control unit and the first unmanned vehicle;
disconnecting the modular control unit from the first unmanned vehicle;
removing the modular control unit from the first unmanned vehicle;
mechanically connecting the modular control unit to a second unmanned vehicle, the second unmanned vehicle being of a type different than a type of the first unmanned vehicle, and wherein the types include at least two from the group comprising unmanned aerial vehicles, unmanned land vehicles, and unmanned water vehicles;
coupling the communication link to the second unmanned vehicle; and
while the modular control unit is carried by the second unmanned vehicle, controlling motion of the second unmanned vehicle via the at least one sensor, the at least one processor, and the communication link.

28. The method of claim 27 wherein the at least one sensor includes a visual sensor.

* * * * *